(No Model.) 2 Sheets—Sheet 1.
S. I. ALLEN.
VEHICLE BRAKE.
No. 510,667. Patented Dec. 12, 1893.
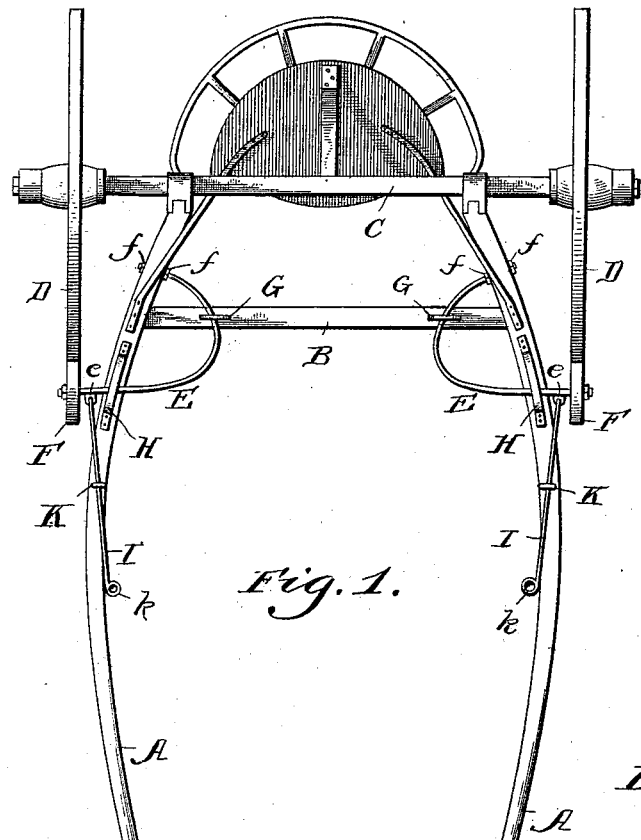
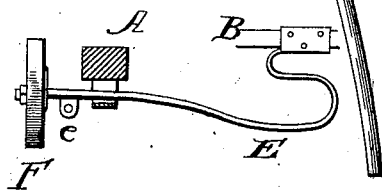
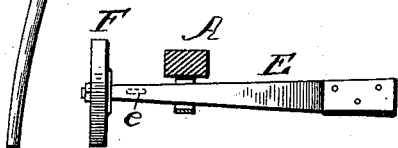
Witnesses:
Inventor
Standhope I. Allen

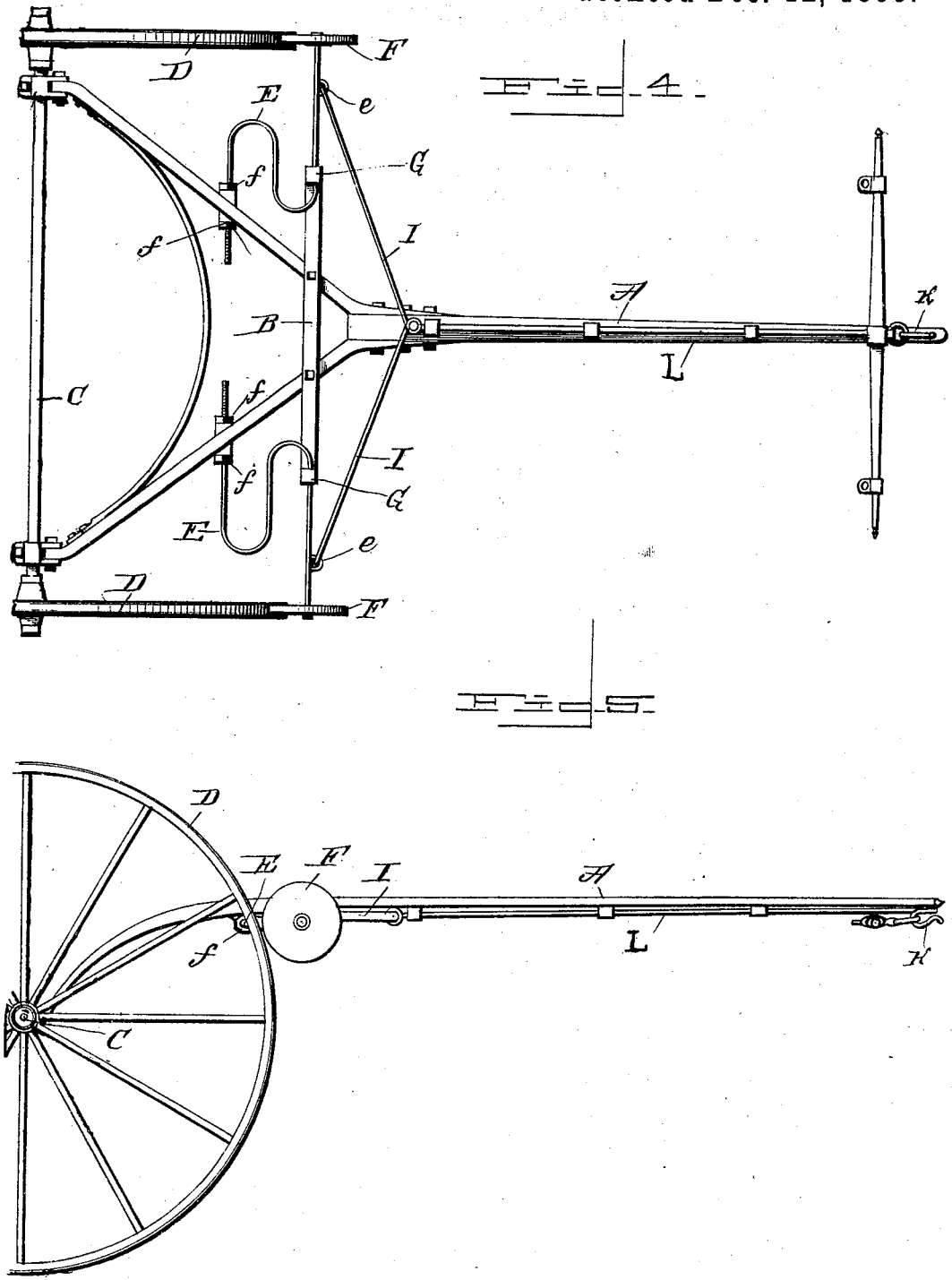

UNITED STATES PATENT OFFICE.

STANDHOPE I. ALLEN, OF CROSSVILLE, ALABAMA.

VEHICLE-BRAKE.

SPECIFICATION forming part of Letters Patent No. 510,667, dated December 12, 1893.

Application filed July 20, 1893. Serial No. 481,068. (No model.)

*To all whom it may concern:*

Be it known that I, STANDHOPE I. ALLEN, a citizen of the United States of America, residing at Crossville, in the county of De Kalb and State of Alabama, have invented certain new and useful Improvements in Roller-Brakes for Vehicles, of which the following is a specification, reference being had to the accompanying drawings.

This invention has relation to vehicle brakes.

This invention has for its object to produce a brake that will be simple in its construction, and effective in its operation, and capable of being applied to any style of vehicle.

The invention consists in the novel construction, arrangement, and combination of parts more particularly hereinafter described and specifically pointed out in the claims.

Referring to the accompanying drawings which form part of this specification and wherein like letters of reference indicate corresponding parts throughout the several views, Figure 1. is a plan view from the underneath side of a portion of a vehicle with my improved roller brakes attached thereto. Fig. 2. is a detail view showing a modification of the cylindrical revoluble brake rollers. Fig. 3. is a detail view of a further modification of the brake. Fig. 4. is an underneath view of my improved brake attached to a two-horse vehicle. Fig. 5. is a view in side elevation.

In the drawings, A, A, represent the shafts of the vehicle, B, the cross piece of the same. C, represents the axle, and D, D, the wheels; E, E, the retractile springs, carrying the revolubly mounted brake rollers F, F; said springs being attached by means of adjusting nuts $f, f,$ to the shafts, and passing under the cross piece B, through staples G, G, and straps or staples H, H, of the shafts A, A. To the retractile springs E, E, are secured at $e$, reciprocating or movable rods I, I. The said rods are retained in position and operate through the staples K, K, and carry at their free ends eyelets $k, k,$ for the purpose of attaching the backing straps of the harness in any suitable manner.

In the operation of the invention, when the horse is backed the reciprocating rods will operate in the same direction, thus forcing back the movable rods I, I, which in turn communicate the motion to the retractile springs E, E, carrying the cylindrical roller brakes F, F, which bear against the periphery of the wheel and arrest its motion; as soon as the horse is moving forward the retractile springs E, E, serve to release the cylindrical roller brakes and retain the same in their normal position away from the wheels.

The roller brake may be made of wood or any suitable material and so attached to the retractile springs, as to allow the rollers to turn, being also arranged that they may be easily removed when it is necessary to replace or repair them.

I wish to call particular attention to the fact, that with my improved brake attached to a vehicle, the brake is brought under complete control, at the same instant when the horse is held back or is backed, without requiring the least attention of the driver, and in this way many accidents may be prevented.

From the above description it will be readily understood how the invention may be easily applied to a two horse wagon, with but slight changes in the detailed construction. For example, the movable rods I, I, as illustrated in the drawings can be brought to the center and there coupled with an extension rod L following the alignment of the tongue, forwardly and operating through staples properly secured. The extension rod being provided at its forward end with suitable means for attachment to the yoke, the operation and results being obvious.

Referring to Figs. 2 and 3, the modifications shown consist of a form of the retractile spring E, which may be preferred, while the operation will be as effective as that of the form illustrated in Fig. 1.

It will be noted that various changes may be made in the detail construction of this device without departing from the general idea involved.

Having fully described my invention, what I claim as new, and desire to secure by Letters Patent, is—

1. In a vehicle brake, the combination of the reciprocating rods, the retractile springs, carrying the cylindrical roller brakes, all parts being constructed and operating substantially as described.

2. In a vehicle brake, the combination of the retractile springs carrying revoluble roller brakes, the reciprocating rods engaging with and actuating said springs for the purpose set forth.

3. In a vehicle brake, the combination of the reciprocating rod, having its forward end slightly bent, said rod coupled to the movable rods, the retractile springs, attached to the movable rods and carrying suitable roller brakes, all parts being arranged substantially as described and for the purpose set forth.

4. In a vehicle brake, the combination of the retractile springs engaging the shaft and extending forwardly in an approximately C-shape, carrying on its lower end revolubly mounted brake rollers, and the reciprocating rods connecting with said springs, substantially as shown and described.

In testimony whereof I affix my signature in presence of two witnesses.

STANDHOPE I. ALLEN.

Witnesses:
GEORGE B. ALLEN,
J. E. GIBSON.